United States Patent [19]

Lagarde et al.

[11] Patent Number: 4,704,425

[45] Date of Patent: Nov. 3, 1987

[54] NOVEL PRECIPITATED SILICA PARTICULATES

[75] Inventors: Robert Lagarde, Feyzin; Jean Machurat, Neuville S/Saone; Jean-Claude Morawski, Chassieu; Georges Vrisakis, Collonges Au Mont D'Or, all of France

[73] Assignee: Rhone-Poulenc Industries, Paris, France

[21] Appl. No.: 673,269

[22] Filed: Nov. 20, 1984

Related U.S. Application Data

[63] Continuation-in-part of Ser. No. 447,958, Dec. 8, 1982, abandoned, which is a continuation of Ser. No. 218,264, Dec. 19, 1980, abandoned.

[30] Foreign Application Priority Data

Dec. 20, 1979 [FR] France ............................ 79 31217

[51] Int. Cl.$^4$ ............................................. C08K 3/34
[52] U.S. Cl. .................................. 524/492; 423/335; 423/339; 106/288 B
[58] Field of Search ............... 524/492; 423/335, 339; 106/288 B

[56] References Cited

U.S. PATENT DOCUMENTS

| | | | |
|---|---|---|---|
| 2,732,360 | 1/1956 | Voight et al. | 524/492 |
| 2,865,882 | 12/1958 | Strassburg | 524/492 |
| 3,445,189 | 5/1969 | Maat et al. | 106/309 |
| 3,915,924 | 10/1975 | Wright | 524/492 |
| 3,951,907 | 4/1976 | Mehta | 524/492 |
| 3,954,944 | 5/1976 | Aldcroft et al. | 423/339 |
| 4,127,641 | 11/1978 | Aldcroft et al. | 423/339 |
| 4,202,813 | 5/1980 | Wason | 524/492 |
| 4,251,281 | 2/1981 | Machurat et al. | 524/493 |
| 4,273,589 | 6/1981 | Nauroth et al. | 106/309 |
| 4,463,108 | 7/1984 | Wagner et al. | 524/492 |

FOREIGN PATENT DOCUMENTS 883863 12/1961 United Kingdom .

OTHER PUBLICATIONS

English translation of Response filed in the EPO on 7/10/86.
Monsanto Technical Bulletin.
Monsanto letter of Aug. 5, 1985.
Report No. 11, 442 of Degussa.

*Primary Examiner*—Joseph L. Schofer
*Assistant Examiner*—N. Sarofim
*Attorney, Agent, or Firm*—Burns, Doane, Swecker & Mathis

[57] ABSTRACT

Improved precipitated silica particulates, well adapted as a pigment or reinforcing filler for curable organosilic polymers and other elastomers, have the properties:

| | |
|---|---|
| (i) BET surface area | 190 to 340 m$^2$/g |
| (ii) CTAB surface area | 180 to 280 m$^2$/g |
| (iii) Ratio $\frac{\text{BET surface area}}{\text{CTAB surface area}}$ | 0.9 to 1.2 |
| (iv) Residual sodium content | < 500 ppm |
| (v) pH | 3.5 to 6.0 |
| (vi) Specific volume | $V_o \geq 4.2$ |
| (vii) Amount of particles of a size as will not pass through a 45μ mesh sieve | < 0.05%. |

12 Claims, No Drawings

NOVEL PRECIPITATED SILICA PARTICULATES

CROSS-REFERENCE TO RELATED APPLICATION

This application is a continuation-in-part of prior application, Ser. No. 447,958, filed Dec. 8, 1982, and now abandoned, which is a continuation of Ser. No. 218,264, filed Dec. 19, 1980, now abandoned.

BACKGROUND OF THE INVENTION

1. Field of the Invention

The present invention relates to novel precipitated silica particulates, and, more especially, to certain hydrophilic precipitated silica particulates well adapted for use as a reinforcing filler for the curable organopolysiloxanes and for other elastomers.

2. Description of the Prior Art

It has long been known to this art to prepare precipitated silica particulates by acidifying an aqueous alkali metal silicate solution, but it was quickly recognized that, in spite of the apparent simplicity of such process, the silica particulates thus prepared were not imbued with satisfactorily attractive overall properties as to enable their use as a desirable reinforcing filler for the various elastomers.

And in spite of repeated efforts to ascertain and coordinate the proper combination of such parameters as determining factor, BET specific surface area, roughness or coalesence factor, oil absorption, and structural index, the resulting filler properties remained far inferior to those imparted by pyrogenic silicas which unfortunately are much too expensive to be of practical use.

Thus, it has long been attempted, in order to enhance the adaptability of the silica particulates for the purpose of reinforcing elastomers, to develop various processes for preparing precipitated silicas, which attempts became increasingly complex and sophisticated, and wherein the temperature, levels of concentration of the reactants (silicate, acid, etc.) the flow rates of the reactants, the sequences of successive reactant addition operations, the pH, etc., had to be very carefully controlled. Compare, for example, French Pat. No. 1,352,354; U.S. Pat. Nos. 3,954,944 and 4,127,641.

Attempts were also made, moreover, to improve the reinforcing nature of precipitated silicas for silicone applications, by rendering the silica particulates hydrophobic by suitable surface treatment (using, for example, a silane, silazane, or like agent). Hydrophilic silicas which have been rendered hydrophobic by means of such a treatment and which can be used as reinforcing fillers for the silicones are described, for example, in French Pat. No. 2,356,596.

Finally, and quite recently, there has also been developed a precipitated silica which is greatly improved filler-wise, but which imparts to organopolysiloxane elastomers, properties of reinforcement which are considerably poorer than those imparted by the pyrogenic silicas (International Rubber Conference held at Kiev, Oct. 10–14, 1978).

Cf. French Pat. Nos. 1,453,198, 1,483,791, 1,150,836, 2,218,285 and 2,353,486; British Pat. No. 883,863.

SUMMARY OF THE INVENTION

Accordingly, a major object of the present invention is the provision of improved precipitated silica particulates, far better adapted as filler materials for the reinforcement of organosilicic polymers and other elastomers, which silica particulates are characterized as comprising the following combination of properties:

| | | |
|---|---|---|
| [i] | BET surface area | 190 to 340 m$^2$/g |
| [ii] | CTAB surface area | 180 to 280 m$^2$/g |
| [iii] | Ratio $\frac{\text{BET surface area}}{\text{CTAB surface area}}$ | 0.9 to 1.2 |
| [iv] | Residual sodium content | <500 ppm |
| [v] | pH | 3.5 to 6.0 |
| [vi] | Specific volume | $V_o \geq 4.2$ |
| [vii] | Advantageously Amount of particles of a size as will not pass through a 45μ sieve | <0.05% |

DETAILED DESCRIPTION OF THE INVENTION

More particularly according to this invention, the improved precipitated silica particulates preferably display the following properties:

| | | |
|---|---|---|
| [i] | BET surface area | 200 to 250 m$^2$/g |
| [ii] | CTAB surface area | 190 to 240 m$^2$/g |
| [iii] | Ratio $\frac{\text{BET surface area}}{\text{CTAB surface area}}$ | 0.9 to 1.2 |
| [iv] | Residual sodium content | <500 ppm |
| [v] | pH | 4.5–5.5 |
| [vi] | Specific volume $V_o$ | $\geq 4.2$ |
| [vii] | Advantageously Amount of particles of a size as will not pass through a 45μ sieve | <0.05% |

The values for the aforesaid properties which characterize the subject precipitated silica particulates are determined in the following manner:

The BET specific surface area is determined by the Brunauer, Emmet & Teller method described in *Journal of the American Chemical Society*, volume 60, page 309 (1938).

The CTAB surface area is determined by absorption of cetyl-trimethylammonium bromide with a pH of 9, using the Jay, Janzen & Kraus method [*Rubber Chemistry and Technology*, 44, pages 1287–1296 (1971)].

The specific volume $V_o$ expressed in cm$^3$/g is determined in the following manner:

3 g of silica are charged into a mold or die having an internal diameter of 25 mm and a height of 80 mm, and then a piston is positioned thereabove. A given weight is added to the piston such as to exert a pressure of 4 kg/cm$^2$ upon the silica. The specific volume of the silica is then measured. This is the volume "$V_o$" expressed in cm$^3$/g (initial volume).

The $V_{600}$ is determined in the same manner, but by exerting a pressure of 600 kg/cm$^2$. In an alternative form of this method, drying is effected at a temperature of 190° C. for 1½ hours, before making the measurement.

The residual sodium content reflects the total remaining amount of sodium. The residual sodium content is measured by flame spectroemission after dissolving the silica in hydrofluoric acid.

The pH is measured on a 5% silica suspension in water.

The nature or type of the organosilicic compositions according to the invention which, after vulcanization, are reinforced by the subject silica particulates, is not critical. Typically, such organopolysiloxane compositions are either solid, gummy, pasty or liquid.

In said compositions, the vulcanizable organosilicic polymer reinforced is such that, with R denoting the hydrocarbon radicals thereof, which are linked to the silicon atoms, the ratio between the total number of radicals R and the total number of silicon atoms is between 0.5 and 3. In forming the organosilicic polymer, the other available valencies of silicon are bonded to heteroatoms such as oxygen or nitrogen, or else to polyvalent hydrocarbon radicals.

Preferably, the filled organosilicic compositions according to the invention are organopolysiloxane compositions in which the organopolysiloxane may be either straight or branched chain, or cross-linked, and may possibly comprise, in addition, hydrocarbon radicals bearing reactive groups or functions, such as, for example, hydroxyl groups, hydrolyzable groups, alkenyl groups, hydrogen atoms, and the like.

More precisely, the organopolysiloxanes which constitute the main ingredients of the compositions according to the invention comprise siloxane recurring units having the following structural formula:

$$R_n SiO_{\frac{4-n}{2}} \qquad (I)$$

possibly also comprising those siloxane units having the following structural formula:

$$Z_x R_y SiO_{\frac{4-x-y}{2}} \qquad (II)$$

In the aforesaid structural formulae, the various symbols are defined as follows:

R represents a group of hydrocarbon nature, which is not hydrolyzable, and which radical may be:

(a) an alkyl or haloalkyl radical having from 1 to 5 carbon atoms and containing from 1 to 6 chlorine and/or fluorine atoms, (b) cycloalkyl and halocycloalkyl radicals having from 3 to 8 carbon atoms and containing from 1 to 4 chlorine and/or fluorine atoms, (c) aryl, alkylaryl and haloaryl radicals having from 6 to 8 carbon atoms and containing from 1 to 4 chlorine and/or fluorine atoms, and (d) cyanoalkyl radicals having from 3 to 4 carbon atoms;

Z is a hydrogen atom, an alkenyl group, a hydroxyl group, a hydrolyzable atom or a hydrolyzable group;

n is an integer of 0, 1, 2 or 3;

x is an integer of 0, 1, 2 or 3; and y is an integer less than or equal to 2.

By way of illustration, the following are exemplary of the organic radicals R which are directly linked to the silicon atoms: the groups methyl; ethyl; propyl; isopropyl; butyl; isobutyl; α-pentyl; t-butyl; chloromethyl; dichloromethyl; α-chloroethyl; α,β-dichloroethyl; fluoromethyl; difluoromethyl; α,β-difluoroethyl; 3,3,3-trifluoropropyl; trifluorocyclopropyl; 4,4,4-trifluorobutyl; 3,3,4,4,5,5-heptafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p-, or m-tolyl; α,α,α-trifluorotolyl; xylyls, such as 2,3-dimethylphenyl; and 3,4-dimethylphenyl.

Preferably, the organic radicals which are linked to the silicon atoms are methyl, phenyl or vinyl radicals, which radicals may possibly be halogenated or may be cyanoalkyl radicals.

The sumbols Z may be hydrogen atoms, chlorine atoms, vinyl groups, hydroxyl groups or hydrolyzable groups such as amino, amido, aminoxy, oxime, alkoxy, alkoxyalkoxy, alkenyloxy, acyloxy, and the like.

The nature of the organopolysiloxane and, therefore, the ratios between the siloxane units (I) and (II) and the distribution thereof is, as is known, selected in dependence on the use envisaged and in dependence on the vulcanization treatment which ultimately is to be performed on the composition.

Thus, the compositions may be those which are vulcanizable at elevated temperature under the action of organic peroxides, such as 2,4-dichlorobenzoyl peroxide, benzoyl peroxide, t-butyl perbenzoate, cumyl peroxide, di-t-butyl peroxide, and the like.

The organopolysiloxane comprising such compositions then essentially consists of the siloxane units I and does not contain any hydrolyzable atoms or groups.

The polymethylpolysiloxanes which are terminated by trimethylsilyl groups represent a particularly important example of this particular category from an industrial point of view.

Vulcanization can also be effected at ambient temperature or at moderate temperature by effecting cross-linking between vinylsilylated or hydrogénosilylated groups, the hydrosilylation reaction being conducted in the presence of catalysts such as derivatives of platinum; the organopolysiloxanes employed do not then contain hydrolyzable groups or atoms.

Vulcanization can also be effected under the action of moisture. The organopolysiloxanes contained in the compositions of this type contain hydrolyzable groups or atoms as defined above. The siloxane units II containing such groups represent at most 15% by weight of the total mass of the organopolysiloxane used. The organopolysiloxane compositions of this type generally contain catalysts such as tin salts.

Finally, vulcanization too can be effected in the presence of cross-linking agents. The organopolysiloxanes employed in these compositions are typically straight-chain, branched or cross-linked polysiloxanes comprised of the units I and II wherein Z is a hydroxyl group and x is at least equal to 1. The cross-linking agent may be a polyfunctional silane, such as methyltriacetoxysilane, isopropyltriacetoxysilane, vinyltriacetoxysilane, methyltris(diethylaminoxy)silane, or the like. Various other compounds such as silicates may also be used as cross-linking agents.

The precipitated silica particulates according to the invention, as defined above with reference to their physical-chemical characteristics, are generally non-microporous, have a large surface area, and have a high level of particle fineness.

The silica particulates according to the invention can be prepared in a number of ways utilizing known techniques, e.g., initial addition of all the silicate, the simultaneous addition of silicate and acid, post-addition treatments, etc., on condition that the values of the various interdependent parameters are properly selected or predetermined such as to give rise to the desired results, with variation in one of the parameters being compensated for by the selected values of the other parameters.

It is possible, for example, to progressively introduce into an aqueous alkali metal silicate solution, carbon dioxide or an aqueous solution of a strong mineral acid, until formation of a gel occurs, followed by precipitation of the silica. The addition of the acid solution is generally effected in a plurality of phases and preferably the addition of acid is interrupted as soon as the opalescence which indicates a rapid rise in viscosity occurs, the addition of acid being resumed only after the gel breaks, such as to adjust the pH-value to from 9 to 7. During this latter addition of acid, the temperature is rapidly raised and is maintained close to 100° C. for at least 20 minutes and preferably for 30 minutes. Without wishing to be bound by the following explanation, it is considered that the aforenoted heat treatment, in this particular pH range, permits blocking of any micropores which may be present.

The addition of acid is then re-commenced until the pH-value of the medium is adjusted to a value of from 3.5 to 5.5, and the precipitated silica is then filtered and washed with pure water (for example, deionized water). Any water whose conductivity is lower than $3 \times 10^{-4}$ $\Omega/cm^2/cm$ may be used.

The washing operation is preferably successively performed by means of pure water which is slightly acidified to a pH-value of 5-4, and then by pure water. After washing, the silica is dried and micronized using the normal methods. Drying is effected, for example, in vortex current apparatus as described in published French patent application No. 2,257,326, and the dwell time therein is less than a minute.

Micronization is performed by means of apparatus of the type Jet-O-Mizer and others, as described in *Chemical Engineers Handbook* of J. H. Perry, 5th edition, part 8/43. The conditions for the drying operation and the micronization operation are so adapted as to achieve, and in accordance with the normal methods used by one skilled in this art, suitable values as regards the parameters $V_o$, moisture content, etc.

Generally, in the process described immediately above, the aqueous solutions of silicates contain from 50 to 120 g/l in equivalent by weight of silicon dioxide, the molar ratio $SiO_2$/alkaline oxide ($Na_2O$ . . . ) is from 2.5 to 4 and the acid solutions can be used in diluted or concentrated form.

The aqueous silicate solution neutralization temperature is initially between 50° C. and 95° C. before the subsequent heating operation for blocking the micropores.

The neutralization temperature must be selected at a higher value in proportion to increasing dilution of the medium in which the gel and then the silica precipitate will be formed. With the same degree of dilution, the rise in temperature makes it possible in fact to reduce the surface area of the precipitated silicas; if the medium is more concentrated, operation will then be in lower temperature regions (50° to 70° C., for example).

Moreover, in accordance with a preferred embodiment, it is possible to initially add a sequestering agent to the aqueous silicate solution, thereby making it possible, at least partially and preferably totally, to complex the traces of metallic impurities (in particular, the alkaline earth metals such as calcium and magnesium) which in practice are always present in the silicate, in very small amounts. The following are exemplary of complexing agents which are suitable: ethylenediamine tetracetic acid (EDTA), sodium nitrilotriacetate (NTA), sodium diethylenetriaminopentacetate (DTPA) and sodium tripolyphosphate (STPP).

In accordance with another preferred embodiment, it is possible to dilute the medium for formation of the silica, with water, after the polysilicic acid gel has broken. This dilution is beneficial since it makes it possible to improve the washability of the silica cake. Moreover, in accordance with an alternative embodiment, it is also possible to use a method referred to as "neutralization with recirculation", which comprises using acid to neutralize the aqueous alkaline silicate solution in a reaction vessel of small capacity (with respect to the total amount of aqueous silicate solution), by regularly circulating therein and in a closed circuit configuration, the aqueous sodium silicate solution which is initially introduced into a container of substantial size; after neutralization, the mixture is returned to the container. Such a method is described, for example, in French Pat. No. 1,160,762.

The precipitated silica particulates according to the invention can be prepared by using a process similar to that described immediately above, but in which, after the pH-value of the medium has been adjusted to a value of from 9 to 7 by a flow of acid, a treatment referred to as "post-addition" is performed, while maintaining approximately the same temperature conditions, such treatment consisting of adding an aqueous silicate solution providing approximately 15 to 50 parts by weight of silicate per 100 parts of silicates used at the beginning of the process. The post-addition operation can be effected instantaneously continuously, and possibly in several operations, but it is necessary in all cases to maintain the pH-value at from 9 to 7, by an additional flow of acid. During the post-addition treatment, re-circulation similar to that described above can be employed.

Blocking of the micropores being achieved, the flow of acid is continued so as to adjust the pH-value to from 5.5 to 3.5. During this latter addition of acid, or upon completion thereof, the temperature of the medium is raised to a value of about 100° C. The silica is then separated, filtered, washed, dried and micronized as in the previous process. In accordance with a preferred embodiment, throughout the operations of pouring acid and silicates, recirculation is effected in accordance with a technique similar to that described in French Pat. No. 1,160,762. Moreover, it is possible for such recirculation to be provided only before the formation of the gel. The addition of water after breaking of the polysilicic acid gel and/or the initial addition of sequestering agent may be used.

In accordance with another embodiment of the invention, it is possible to prepare the silica particulates by simultaneous addition of acid solution and alkali metal silicate solution. The simultaneous feedstreams are generally started on a base of dilute silicate having a pH-value of from 10.2 to 8. Preferably, a sequestering agent is introduced into the aqueous silicate solution forming the base; the base generally represents from 15 to 20% of the final total volume. The acid and the silicate are introduced into the reaction vessel at a temperature of from 80° C. to 95° C., with the pH-value being maintained at from 9.8 to 10.2. When all the silicate has been introduced, a thermal peptization treatment is effected, with the pH-value being adjusted to from 9 to 7 and with the medium being heated to around 100° C. When this treatment is concluded (it generally lasts at least 20 minutes), the addition of acid is resumed to adjust the pH-value to from 5.5 and 3.5. The silica is then separated, washed, and dried and micronized as in the preceding processes. In an alternative embodiment of said process, it is possible to use the method of neutralization with recirculation of the silicate base in the neutralization reaction vessel (this method also being similar to that described in French Pat. No. 1,160,762).

In accordance with an alternative embodiment of the invention, the organosilicic compositions may contain, as a reinforcing agent, precipitated silica particulates as defined above, which have subsequently been subjected to normal post-treatment for modifying their surface properties, notably for rendering same hydrophobic. Such modified silica particulates are equally suitable for reinforcing organopolysiloxane elastomers. The nature of the various agents for modifying the surface properties is not critical. The agents used are typically organosilicic in nature, such as siloxanes (hexamethyldisilazane, etc.), alkyl silanes (trimethylsilane, etc.), alkylalkoxysilanes (trimethylethoxysilane, etc.), alkylchlorosilanes, alkenylchlorosilanes, dihydroxylorganopolysiloxanes, cyclosiloxanes, and the like, and are, for example, described in French Pat. Nos. 2,356,596 and 2,395,952.

The precipitated silica particulates may also be heated to a temperature typically ranging from 200° to 800° C. Thus, the content in relative humidity and rehumidification is reduced.

As will all precipitated silica particulates, the silica particulates used in accordance with the present invention may have a relative moisture content which is variable depending on the production and/or storage conditions. The relative moisture content is generally between 2 and 6% (measured by heating for 2 hours at a temperature of 105° C.). The water content of the silica particulates which are incorporated in the organopolysiloxane compositions evidently depends on the intended end use. For extrudable compositions, the water content must be less than 3%.

The organosilicic compositions according to the invention contain from 5 to 50% and preferably from 10 to 40% of precipitated silica particulates which are possibly treated as defined hereinbefore.

In addition, besides the polysiloxanes, precipitated silica which may have been treated, cross-linking agents and cross-linking catalysts, the compositions may contain normal fillers such as powdered quartz, diatomaceous earth, talcum, carbon black, and the like. The compositions may also contain various normal additives such as anti-structure agents, thermal stabilizing agents, thixotropic agents, pigments, corrosion inhibitors, and the like.

The anti-structure agents which are also known by the name of plasticizers are generally organosilicic in nature and are introduced in a proportion of from 0 to 20 parts per 100 parts of the organosilicic composition to be reinforced. They make it possible to avoid hardening of the compositions during storage. The anti-structure agents may include silanes with hydrolyzable groups, or hydroxylated or alkoxylated diorganopolysiloxane oils of low molecular weight. Such compositions are, for example, described in French Pat. No. 1,111,969.

Among the thermal stabilizing agents which are well known to one skilled in this art, mention is made of the salts, oxides and hydroxides of iron, cerium or manganese. These additives which may be used either alone or in admixture are generally introduced in a proportion of 0.01 to 5% with respect to the weight of the organopolysiloxane.

The organopolysiloxane compositions are prepared by simple mixing of the various ingredients of the composition, as described hereinbefore. Mixing can be carried out at ambient temperature or at elevated temperatures, and whether or not the composition comprises silica particulates which either have or have not been treated for modification of the surface properties thereof.

After vulcanization, the organopolysiloxane compositions according to the invention give rise to elastomers, the mechanical and thermal properties of which are on the same order as those of organopolysiloxane elastomers which are reinforced with pyrogenic silica particulates. The use of the organosilicic compositions according to the invention is also one aspect of the present invention, for the production of hardened materials.

However, as already stated hereinbefore, the silica particulates according to the invention can also be used for reinforcing such other elastomer materials as SBR rubbers, and the like.

In order to further illustrate the present invention and the advantage thereof, the following specific examples are given, it being understood that same are intended only as illustrative and in nowise limitative.

EXAMPLE 1

The precipitated silica used in this example was prepared in the following manner:

108 kg of an aqueous solution of sodium silicate, heated to a temperature of 76° C. (the aqueous sodium silicate solution had an initial $SiO_2$ concentration equal to 80 g/l; the ratio r was equal to 3.5) were introduced into a violently agitated container. To this solution there was added 0.33 kg of an aqueous 40% sodium diethylenetriamino-pentacetate solution, and then recirculation of the solution was established, at a rate of 2 $m^3$/h in an agitated reaction vessel of small capacity (5 l) which is conveniently referred to hereinafter as the "pre-reaction vessel". While maintaining the solution at a temperature of 76° C., aqueous solution of sulfuric acid having a specific gravity d=1.22 was poured into the pre-reaction vessel at a rate of 130 $cm^3$/minute, for a period of 50 minutes.

The flow of acidic aqueous solution was interrupted after 10 minutes when marked opalescence had occurred; 62 liters of water were then added over a period of 15 minutes, with the temperature being maintained, and then the temperature was raised to about 90° C. after the 70th minute. This temperature was reached at the 88th minute. From that moment, 37 kg of an aqueous sodium silicate solution were added to the pre-reaction vessel, up to the 128th minute, at a rate of 625 $cm^3$/minute, while maintaining the pH-value at 7.5±0.1 by adding the acid solution at a rate of 63 $cm^3$/minute and while maintaining the temperature at from 85° C. to 90° C. The additional flow of silicate being terminated at the 128th minute, the addition of acid was continued until the pH-value was adjusted to 3.5, while continuing heating at from 90° to 100° C. The silica was then filtered, washed, dried by flash drying in an apparatus of the type described in French Pat. No. 2,257,326, and micronized in an apparatus of the type Jet-O-Mizer and others, as described in *Chemical Engineers Handbook*, 5th edition, 8–43 or 8–44.

The resulting silica had the following characteristics:

| | |
|---|---|
| [i] BET surface area | 242 $m^2$/g |
| [ii] CTAB surface area | 237 $m^2$g |

-continued

| | | |
|---|---|---|
| [iii] | Ratio between the BET/CTAB surface areas | 1.021 |
| [iv] | Residual sodium content | 425 ppm |
| [v] | pH-value | 5.1 |
| [vi] | Specific volume $V_o$ | 4.8 cm$^3$/g |
| [vii] | Size of the particles (inability to pass through a 45μ sieve) | <0.05% |
| [viii] | Moisture content at 105° C. | 5.90% |
| [ix] | Weight loss at 1200° C. | 9.22% |

This silica was first used for reinforcing organopolysiloxane materials (EVC).

(a) Preparation of the reinforced composition:

100 parts of a polydimethylsiloxane gum (which contained 720 mg of vinyl groups per kg, said gum having been devolatilized and being terminated by trimethylsiloxy units, and which also had a viscosity of 20×10$^6$ centipoises [$\overline{M_w}$=6×10$^5$] at a temperature of 25° C.) were homogenized; 0.4 part of a paste containing 50% of iron octoate was added, in a sample of polydimethylsiloxane gum, and 6 parts of plasticizer (α,ω-dihydroxylated polydimethylsiloxane containing 8.3% of hydroxyl groups) were introduced, followed by 40 parts of the precipitated silica.

Finally, there was introduced into the organopolysiloxane composition, the vulcanization or curing agent which comprised one part of a paste containing 50% of 2,4-dichlorobenzoyl peroxide, in a polyorganosiloxane oil.

Vulcanization or curing was then performed by heating the mixtures which were placed in molds 2 mm in thickness, for a period of 8 minutes, at a temperature of 115° C., under press force (pressure of 60 kg/cm$^2$). Th elastomers were optionally subjected to an annealing treatment for a period of 16 hours at 200° C.

In another embodiment, organopolyxiloane compositions to which had not yet been added a vulcanization agent were produced either at ambient temperature or at 150° C.

(b) Properties of the resultant elastomers:

The mechanical properties of the organopolysiloxane elastomers produced after vulcanization and optional annealing were compared to those of elastomers produced by replacing the precipitated silica with a pyrogenic silica having substantially the same surface area (Cab-O-Sil); BET surface area 217 m$^2$/g; CTAB surface area 206 m$^2$/g).

The results are reported in the following tables:

TABLE I

| VULCANIZED AND NON-ANNEALED MIXTURES | | | | |
|---|---|---|---|---|
| | Organopolysiloxane composition mixed at 25° C. | | Organopolysiloxane Composition mixed for 1 hour, 30 minutes at 150° C. | |
| | Precipitated silica of the invention | Silica "Cab-O-Sil" | Precipitated silica of the invention | Silica "Cab-O-Sil" |
| Shore A hardness | 61 | 55 | 49 | 46 |
| Modulus kg/cm$^2$ (100%) | 19.8 | 14.5 | 20.5 | 16.6 |
| Rupture strength kg/cm$^2$ | 76 | 76 | 80 | 71 |
| Elongation to rupture % | 430 | 449 | 428 | 385 |
| Tearing strength kg/cm | 18 | 15 | 15 | 11 |
| Zwick resiliency % | 39 | 42 | 46 | 41 |
| Residual compression deformation % (70 hours at 150° C./30% | 78 | 75 | 62 | 59 |

TABLE II

| VULCANIZED MIXTURES ANNEALED FOR 16 HOURS AT 200° C. | | | | |
|---|---|---|---|---|
| | Organopolysiloxane composition mixed at 25° C. | | Organopolysiloxane composition mixed for 1 hour, 30 minutes at 150° C. | |
| | Precipitated silica of the invention | Silica "Cab-O-Sil" | Precipitated silica of the invention | Silica "Cab-O-Sil" |
| Shore A hardness | 74 | 69 | 58 | 55 |
| Modulus kg/cm$^2$ | 30 | 22.5 | 26.9 | 22 |
| Rupture strength kg/cm$^2$ | 73 | 80 | 86 | 83 |
| Elongation to rupture % | 302 | 316 | 330 | 358 |
| Tearing strength kg/cm | 14 | 15 | 11 | 12 |
| Zwick resiliency % | 46 | 48 | 54 | 49 |
| Residual compression deformation % (70 hours at 150° C./30% | 21 | 23 | 15 | 17 |

The subject silica was next used without micronization for reinforcing other elastomers.

The $V_{600}$ of the silica was determined to be equal to 1.23 and, when preliminarily dried at 190° C., to be 1.49.

The following recipe was used in this example (in parts by weight):

| | | |
|---|---|---|
| [i] | Butadiene-styrene copolymer extended with oils (SBR 1502) | 100.00 |
| [ii] | Aromatic oil (Dutrex V10) | 20.00 |
| [iii] | Stearic acid | 1.50 |
| [iv] | Sulfur | 2.80 |
| [v] | N—isopropyl-N—phenyl-para-phenylene diamine (antioxidant Permanax IPPD | 1.50 |
| [vi] | Phenylene diamine (antioxidant Permanax 6PPD) | 1.50 |
| [vii] | N—cyclohexyl-2-benzothiozyl sulphenamide (Vulcafor CBS) | 3.00 |
| [viii] | Gamma-mercaptopropyl-trimethoxysilane (A 189) | 2.50 |
| [ix] | Silica | 60.00 |
| [x] | Polyethylene glycol (PEG 4000) | |

Operation was performed in a 1 liter internal Banbury mixer and then resumed in a cylinder-type mixer.

The following tests were performed:

Static And Dynamic Mechanical Tests:

(1) Monsanto Rheometer (ASTM D 2084)

Measured the rheological properties of the mixture during vulcanization:

Minimum torque (Cm): consistency of the unvulcanized mixture (crude mixture at the temperature of the test);

Maximum torque (CM): consistency of the mixture after cross-linking;

Torque: CM-Cm, related to the degree of cross-linking;

Induction Period: time required to initiate cross-linking at the temperature of the test;

Index: related to the speed of vulcanization (optimum time-induction period);

Optimum time: $X = \frac{(CM - Cm) \times 90}{100} + Cm$

Torque X → Y minutes
(ordinate) (abscissa)
Y min = optimum time.

These properties are described in particular in the *Encyclopaedia of Polymer Science & Technology*, Volume 12, page 265 (Interscience Publishers—John Wiley & Sons, Inc.).

(2) Static properties:

Those which are measured in accordance with the following standards:

(a) ASTM D 412-51 T
Rupture strength kg/cm$^2$
Elongation %
Modulus (b) ASTM D 2240-75
Shore A hardness (c) DIN 53516
Abrasion (resistance to)

(3) Dynamic properties:
ASTM D 623-67
Goodrich flexometer

This apparatus is for subjecting a vulcanizate to alternating deformation stresses and to determine its fatigue strength.

(a) Static compression (SC%): deflection under a constant load.

(b) Permanent deformation (PD%): percentage of residua. deformation after test.

(c) Dynamic compression (DC%): percent of deformation during the test.

DCO: dynamic compression at the beginning of the test.
DCF: dynamic compression at completion of the test.
$\Delta DC = DCF - DCO$ evoluation of the dynamic compression, related to fatigue strength.

(d) ΔT. base: ΔT. between the temperature at the surface of the testpiece (at its base) and the temperature of the chamber.

(e) ΔT. core: ΔT. between the temperature at the core or heart of the testpiece and the temperature of the chamber.

(f) Conditions of the tests:
Load 24 lbs, deflection 22.2%, frequency 21.4 Hz.
Temperature of the chamber—50° C.

The results are reported in the following table:

TABLE III

|  | 5% PEG on silica | | 7% PEG on silica | |
| --- | --- | --- | --- | --- |
| SILICA | 60 | | 60 | |
| BET SURFACE AREA | 247 | | 247 | |
| CTAB SURFACE AREA | 226 | | 226 | |
| MICROPOROSITY | 21 | | 21 | |
| PEG 4000 (% on silica) | 5 | | 7 | |
| RHEOMETER at 150° C. | | | | |
| TORQUES: Mini-Maxi | 8.5–8.45 | | 12–89 | |
| Δ TORQUE | 76 | | 77 | |
| INDUCTION TIME - INDEX | 6 min 30 s–10 min | | 5 min–9 min | |
| OPTIMUM | 17 min | | 14 min | |
| STATIC PROPERTIES | | σ | | σ |
| RUPTURE STRENGTH kg/cm$^2$ | 194 | 5 | 191.5 | 8.2 |
| SHORE A HARDNESS | 66 | — | 67 | — |
| MODULUS AT 100% EL. | 12 | 1.2 | 13 | 1 |
| MODULUS AT 200% EL. | 66 | 4.0 | 71 | 5 |
| ELONGATION % | 534 | 18 | 535 | 25.5 |
| TEARING kg/cm | 28.6 | 10 | 37.0 | 8.5 |
| ABRASION DIN (loss) | 148 | — | 153 | — |
| MATTIA BENDING | | | | |
| kg/cycles with notch | 16 | | 19 | |
| kg/cycles without notch | 120 | | 150 | |
| (ASTM: D 813-57 T | | | | |
| GOODRICH FLEXOMETRY | | | | |
| C = 24 lbs - D = 22.2% | | | | |
| F = 21.4 Hz θ = 50° C. | | | | |
| STATIC COMPRESSION % | 11.4 | | 10.95 | |
| DYNAMIC COMPRESSION % BEGINNING | 4.4 | | 3.9 | |
| DYNAMIC COMPRESSION % COMPLETION | 5.4 | | 4.8 | |
| Δ DCF-DCO | 1.0 | | 0.9 | |
| Δ T. base | 29.0 | | 28.0 | |
| Δ T. core | 102 | | 99.0 | |
| PERMANENT DEFORMATION % (PD) | 3.0 | | 2.55 | |

There will be noted, in particular, a spectacular improvement in the resistance to bending without notch (MATTIA), on the order of 3 to 4 times that which is obtained under the same conditions utilizing a silica not in accordance with the invention, with a pH-value on the order of 7.

Slices were taken from the silica reinforced vulcanizate, a few microns per side, and then the silica was preferentially colored with methyl red in order to visualize the silica by optical microsocpy, the silica at the beginning having the same refractive index as the elastomer.

The percentage of dispersion is the percentage of silica dispersed in conglomerates of less than 8 microns. It is calculated as follows:

$$\% \text{ dispersion} = 100 \frac{SX}{L}$$

X—the total number of 17 microns in a grid of 10,000 squares.

S—surface swelling factor, due to the action of the swelling agent, $$i.e., S = \frac{\text{surface area of the slice after swelling}}{\text{surface area of the slice before swelling}}$$

L—percentage volume of the silica with respect to the rubber in its entirety.

Weight of the silica ×specific volume of the silica×100=weight of the mixture×specific volume of the mixture.

On the same principle, by varying the enlargements of the optical microscope, one can determine the percentage of silica dispersed in conglomerates of less than $3\mu$ and less than $0.7\mu$, each square of the grid or reticle having a linear dimension of 6 and $1.4\mu$ at the different enlargements.

The dispersion improves in proportion to the increase in such percentage.

The results obtained in respect of dispersion are as follows:

| Dispersion: | |
|---|---|
| $<8\mu$ | 99.5 |
| $<3\mu$ | 98 |
| $<0.7\mu$ | 94 |

EXAMPLE 2

Silica as prepared in accordance with the procedure of Example 1 was precipitated in a batch reactor from sodium silica (SiO$_2$/Na$_2$O=3.4 by weight) and sulfuric acid (addition of sulfuric acid in a pool of silicate with interruption of the acid at the beginning of the gel). After the formation of the gel, acid was again added and thereafter silicate and acid were added simultaneously in order to eliminate microporosity.

The resulting slurry of precipitated silica was filtered and then washed in order to reduce the Na content to the desired level of less than 500 ppm.

A portion of the slurry was flash dried with a device using a shaft spinning flow (Leaflash system of RHONE-POULENC), according to French Pat. No. 2,257,326 with the remainder of the slurry being dried in an oven with a gas temperature at the inlet of 500° C. and at the outlet of 150° C., partially dried at 120° C. during 15 hours.

The products of this process produce the characteristics reproduced in Table IV below.

TABLE IV

| | Flash Dried | Oven Dried |
|---|---|---|
| CTAB Surface Area m$^2$/g | 250 | 250 |
| BET surface area m$^2$/g | 260 | 260 |

TABLE IV-continued

| | Flash Dried | Oven Dried |
|---|---|---|
| pH | 4.7 | 4.9 |
| Sample of Oil DBP (NF T 30 - 022) | 350 | 250 |
| Vo cm$^3$/g | 4.2 | 3.2 |
| Apparent Density (NF A 95-112) | 0.19 | 0.31 |

The products were then tested in rubber, according to the following recipe (in parts by weight):

| Butadiene-styrene copolymer SBR 1509 | 100 |
|---|---|
| Silica | 50 |
| Polyethylene glycol (PEG 4000) | 3 |
| ZnO | 3 |
| Octylated diphenyl amine (antioxidant Permanax OD) | 2 |
| Stearic acid | 1 |
| MBTS | 0.75 |
| DOTG | 1.6 |
| Sulfur | 2.5 |

It is observed that the rubber was transparent when flash dried silica was used and opaque otherwise. Opacity is of great importance for one skilled in the art in fields where there exists a need for colored rubber products, such as in the manufacture of crepe rubber-soled shoes.

The other properties for these rubber materials are nearly equivalent, as seen upon reference to Table V below.

TABLE V

| | Silica | |
|---|---|---|
| Properties of Charged Rubber | Flash Dried | Oven Dried |
| Module 100% MPa | 1.49 | 1.49 |
| Module 300% MPa | 2.25 | 2.53 |
| Abrasion Loss mm$^3$ | 159 | 154 |
| Resistance to Rupture MPa | 18.5 | 15.9 |
| Elongation to Rupture % | 803 | 821 |
| Resistance to Tear (KN/m) | >40 | >40 |

EXAMPLE 3

Preparation of the precipitated silica used in Example 3

30.1 of water and 0.5 l of a 40% sodium diethylenetriaminopentacetate aqueous solution were introduced into a severely agitated reaction vessel, and then the step of adding the aqueous sodium silicate solution was commenced (concentration in respect of SiO$_2$ of 80 g/l; the ratio r being equal to 3.5), at a rate of 1250 cm$^3$/minute, with the temperature being maintained at from 80° to 100° C., until the pH-value was adjusted to 10. The pouring of silicate was continued and at the same time the step of pouring the acid (sulfuric acid, in a proportion of 92.5 g/l) was commenced, at a rate of 310 cm$^3$/minute. The silicate addition was terminated at the 100th minute, and the addition of acid was continued until the pH-value was 8, and then heating was effected at a temperature of 95° C. for 20 minutes. The addition of acid was then resumed to adjust the pH value to 3.5. The silica was then filtered, washed, dried, crushed and micronized, as in Example 1.

The resultant silica had the following characteristics:

| [i] BET surface area | 206 m²/g |
|---|---|
| [ii] CTAB surface area | 194 m²/g |
| [iii] BET/CTAB surface area ratio | 1.062 |
| [iv] Residual sodium content | 150 ppm |
| [v] pH-value | 5.1 |
| [vi] Specific volume $V_o$ | 5 cm³/g |

100 parts of the siloxane gum of Example 1 and 4 parts of the plasticizer of Example 1 were mixed at ambient temperature on roller-type mixers, and 35 parts of the precipitated silica were added.

The vulcanization and annealing conditions were identical to those of Example 1.

The results are reported in the following table:

TABLE VI
VULCANIZED MIXTURES ANNEALED FOR 16 HOURS AT 200° C.

| | Organopolysiloxane composition mixed at 25° C. | | Organopolysiloxane composition mixed for 1 hour, 30 minutes at 150° C. | |
|---|---|---|---|---|
| | Precipitated silica of the invention | Silica "Cab-O-Sil" | Precipitated silica of the invention | Silica "Cab-O-Sil" |
| Shore A hardness | 58 | 60 | | |
| Modulus kg/cm² | 20.9 | 20.3 | | |
| Rupture strength kg/cm² | 79 | 80 | | |
| Elongation to rupture % | 360 | 350 | | |
| Tearing strength kg/cm | 10 | 11 | | |
| Zwick resiliency % | 45 | 43 | | |
| Residual compression deformation % (70 hours at 150° C./30% | 12 | 15 | | |

EXAMPLE 4

Process for the preparation of the silica used in Example 4

13.2 l of aqueous solution of sodium silicate, heated to a temperature of 90° C., were introduced into a violently agitated reaction vessel (the sodium silicate solution had an initial concentration in respect of $SiO_2$ of 55 g/l; the ratio r was equal to 3.5).

2 g of complexing agent (sodium nitrilotriacetate) were added to the above-indicated solution, and then an aqueous, 30% sulfuric acid solution was progressively added, at a rate of 13.3 cm³/minute. The addition was interrupted at the 20th minute, when opalescence occurred.

The addition of acid was resumed at the 47th minute and then continued to the 82nd minute when the pH-value had become 7.5. A fresh amount of sodium silicate, of identical concentration, was then added at a rate of 80.2 cm³/minute, up to the 122nd minute, while maintaining the temperature, and the pH-value at 7.5±0.2 by pouring in the aqueous acid solution. After completion of the operation of introducing the silicate solution, the operation of adding the aqueous acid solution was continued until the pH-value was adjusted to 3.5. The silica was then filtered, washed, dried, crushed and micronized as in the previous examples.

The resultant silica had the following characterisics:

| [i] BET surface area | 240 m²/g |
|---|---|
| [ii] CTAB surface area | 224 m²/g |
| [iii] Ratio between the BET/CTAB surface area | 1.071 |
| [iv] Residual sodium content | 300 ppm |
| [v] Specific volume $V_o$ | 4.2 cm³/g |
| [vi] Size of the particles (inability to pass through a 45μ sieve) | <0.05% |
| [vii] Moisture content at 105° C. | 6.3% |

An organopolysiloxane composition was prepared by replacing, in the recipe for the organopolysiloxane composition of Example 3, the instant precipitated silica for that of said example.

The vulcanization conditions were identical to those of Example 1.

The results are reported in the following table:

TABLE VII
VULCANIZED MIXTURES ANNEALED FOR 16 HOURS AT 200° C.

| | Organopolysiloxane composition mixed at 25° C. | |
|---|---|---|
| | Precipitated silica of the invention | Silica "Cab-O-Sil" |
| Shore A hardness | 65 | 60 |
| Modulus kg/cm² | 22.0 | 20.3 |
| Rupture strength kg/cm² | 78 | 80 |
| Elongation to rupture % | 320 | 350 |
| Tearing strength kg/cm | 11 | 11 |
| Zwick resiliency % | 40 | 43 |
| Residual compression deformation % (70 hours at 150°/30%) | 11 | 15 |

EXAMPLE 5

An organopolysiloxane composition which was heat curable was prepared, in accordance with Example 1, by replacing the precipitated silica of that example by a precipitated silica which had been treated with octamethylcyclotetrasiloxane, and having the following characteristics:

| [i] BET surface area | 150 m²/g |
|---|---|
| [ii] Residual sodium content | 400 ppm |
| [iii] Specific volume $V_o$ | 4.2 cm³/g |
| [iv] Size of the particles (inability to pass through a 45μ sieve) | <0.05% |
| [v] Moisture content at 105° C. | 1.5% |

This particular precipitated silica was produced by heating, with octamethylcyclotetrasiloxane, the precipitated silica of hydrophilic nature, as described in Example 1.

The composition produced was then vulcanized and annealed using the mode of operation of Example 1.

The results are reported in the following tables:

TABLE VIII

VULCANIZED AND NON-ANNEALED MIXTURES

| | Organopolysiloxane composition mixed at 25° C. | |
|---|---|---|
| | Precipitated silica of the invention | Silica "Cab-O-Sil" |
| Shore A hardness | 65 | 58 |
| Modulus kg/cm$^2$ | 35 | 23 |
| Rupture strength kg/cm$^2$ | 86 | 93 |
| Elongation to rupture % | 324 | 396 |
| Tearing strength kg/cm | 19 | 20 |
| Zwick resiliency % | 36 | 36 |
| Residual compression deformation % (70 hours at 150°/30%) | 48 | 65 |

TABLE IX

VULCANIZED MIXTURE ANNEALED FOR 16 HOURS AT 200° C.

| | Organopolysiloxane composition mixed at 25° C. | |
|---|---|---|
| | Precipitated silica of the invention | Silica "Cab-O-Sil" |
| Shore A hardness | 70 | 65 |
| Modulus kg/cm$^2$ | 36 | 33 |
| Rupture strength kg/cm$^2$ | 85 | 99 |
| Elongation to rupture % | 282 | 306 |
| Tearing strength kg/cm | 15 | 18 |
| Zwick resiliency % | 39 | 40 |
| Residual compression deformation % (70 hours at 150°/30%) | 16 | 22 |

EXAMPLE 6

Precipitation of a cold-vulcanizable organopolysiloxane composition 100 parts of dihydroxylated polydimethylsiloxane oil having a viscosity of 60,000 cst at 25° C. ($\overline{M_w} = 1.3 \times 10^5$) were homogenized at ambient temperature, and there were added thereto 5 parts of a thixotropic agent formed from a dihydroxypoly(methylphenyl)-siloxane containing 5% of hydroxyl groups and 15 parts of the precipitated silica described in Example 5, and then the mixture was heated at a temperature of 150° C. under reduced pressure. After cooling, there were added the catalyst (namely, 5 parts of methyltriacetoxysilane) and the vulcanization accelerator (namely, 0.02 parts) of the reaction product between 2 moles of dibutyl tin dilaurate and 1 mole of butyl titanate. The mixture was homogenized under reduced nitrogen pressure (400 Pa) and then formulated in cartridge form. Vulcanization of the samples was effected at ambient temperature, under the action of the moisture in the air. The results are reported in the following table:

TABLE X

ORGANOPOLYSILOXANE COMPOSITIONS CONTAINING A THIXOTROPIC AGENT AND CHARGED WITH THE PRECIPITATED SILICA OF EXAMPLE 4 OR WITH SILICA, "Cab-O-Sil"

| | Nature of the precipitated silica introduced into the composition | |
|---|---|---|
| | Silica according to the invention | "Cab-O-Sil" |
| Extrusion (2 bars) g/min | 113 | 89 |
| Shore A hardness | 37 | 38 |
| Modulus kg/cm$^2$ at 100% | 10.5 | 11.0 |
| Breaking strength kg/cm$^2$ | 24 | 29 |
| Elongation to rupture % | 299 | 318 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Precipitated silica particulates which are generally non-microporous, said particulates having the properties:

| | | |
|---|---|---|
| (i) | BET surface area | 190 to 340 m$^2$/g |
| (ii) | CTAB surface area | 180 to 280 m$^2$/g |
| (iii) | Ratio $\frac{\text{BET surface area}}{\text{CTAB surface area}}$ | 0.9 to 1.2 |
| (iv) | Residual sodium content | < 500 ppm |
| (v) | pH | 3.5 to 6.0 |
| (vi) | Specific volume | $V_o \geq 4.2$ |
| (vii) | Amount of particles of a size as will not pass through a 45μ mesh sieve | < 0.05%. |

2. The precipitated silica particulates as defined by claim 1, said particulates having the properties:

| | | |
|---|---|---|
| (i) | BET surface area | 200 to 250 m$^2$/g |
| (ii) | CTAB surface area | 190 to 240 m$^2$/g |
| (iii) | Ratio $\frac{\text{BET surface area}}{\text{CTAB surface area}}$ | 0.9 to 1.2 |
| (iv) | Residual sodium content | <500 ppm |
| (v) | pH | 4.5–5.5 |
| (vi) | Specific volume $V_o$ | $\geq 4.2$ |
| (vii) | Amount of particles of a size as will not pass through a 45μ mesh sieve. | <0.05% |

3. The precipitated silica particulates as defined by claim 1, said particulates having been surface hydrophobicitized.

4. The precipitated silica particulates as defined by claim 2, said particulates having been surface hydrophicitized.

5. Precipitated silica particulates which are generally non-microporous, said particulates having the properties:

| | | |
|---|---|---|
| (i) | BET surface area | 190 to 340 m$^2$/g |
| (ii) | CTAB surface area | 180 to 280 m$^2$/g |
| (iii) | Ratio $\frac{\text{BET surface area}}{\text{CTAB surface area}}$ | 0.9 to 1.2 |
| (iv) | Residual sodium content | <500 ppm |
| (v) | pH | 3.5 to 6.0 |
| (vi) | Specific volume | $V_o \geq 4.2$. |

6. The precipitated silica particulates as defined by claim 1, said particulates having the properties:

| | | |
|---|---|---|
| (i) | BET surface area | 200 to 250 m$^2$/g |
| (ii) | CTAB surface area | 190 to 240 m$^2$/g |
| (iii) | Ratio $\frac{\text{BET surface area}}{\text{CTAB surface area}}$ | 0.9 to 1.2 |
| (iv) | Residual sodium content | <500 ppm |

|     |     |     |
| --- | --- | --- |
| (v) pH | | 4.5–5.5 |
| (vi) Specific volume $v_o$ | | $\geq 4.2$. |

7. Flash-dried precipitated silica particulates which are generally non-microporous, said particulates having the properties:

|     |     |     |
| --- | --- | --- |
| (i) BET surface area | | 190 to 340 m$^2$/g |
| (ii) CTAB surface area | | 180 to 280 m$^2$/g |
| (iii) Ratio $\dfrac{\text{BET surface area}}{\text{CTAB surface area}}$ | | 0.9 to 1.2 |
| (iv) Residual sodium content | | <500 ppm |
| (v) pH | | 3.5 to 6.0 |
| (vi) Specific volume | | $V_o \geq 4.2$. |

8. The precipitated silica particulates as defined by claim 5, said particulates having the properties:

|     |     |     |
| --- | --- | --- |
| (i) BET surface area | | 200 to 250 m$^2$/g |
| (ii) CTAB surface area | | 190 to 240 m$^2$/g |
| (iii) Ratio $\dfrac{\text{BET surface area}}{\text{CTAB surface area}}$ | | 0.9 to 1.2 |
| (iv) Residual sodium content | | <500 ppm |
| (v) pH | | 4.5–5.5 |
| (vi) Specific volume $V_o$ | | $\geq 4.2$. |

9. In a filled, reinforced non-organosilicic elastomeric composition of matter, the improvement which comprises as the reinforcing filler therefor, a reinforcing amount of the precipitated silica particulates as defined by claim 5.

10. The elastomeric composition of claim 9, wherein the elastomeric composition comprises a styrene-butadiene copolymer.

11. In a filled, reinforced non-organosilicic elastomeric composition of matter, the improvement which comprises, as the reinforcing filler therefor, a reinforcing amount of the precipitated silica particulates as defined by claim 6.

12. The elastomeric composition of claim 10 wherein the elastomeric composition comprises a styrene-butadiene copolymer.

* * * * *